US011051919B2

(12) United States Patent
Serval et al.

(10) Patent No.: US 11,051,919 B2
(45) Date of Patent: Jul. 6, 2021

(54) TOOTHBRUSH SYSTEM WITH MAGNETOMETER FOR DENTAL HYGIENE MONITORING

(71) Applicant: Kolibree, Paris (FR)

(72) Inventors: Thomas Serval, Paris (FR); Samuel Landau, Paris (FR)

(73) Assignee: Kolibree, Paris (FR)

( * ) Notice: Subject to any disclaimer, the term of this patent is extended or adjusted under 35 U.S.C. 154(b) by 243 days.

(21) Appl. No.: 15/573,785

(22) PCT Filed: May 12, 2016

(86) PCT No.: PCT/EP2016/060715
§ 371 (c)(1),
(2) Date: Nov. 13, 2017

(87) PCT Pub. No.: WO2016/180929
PCT Pub. Date: Nov. 17, 2016

(65) Prior Publication Data
US 2018/0125623 A1    May 10, 2018

Related U.S. Application Data

(60) Provisional application No. 62/161,149, filed on May 13, 2015.

(51) Int. Cl.
*A61C 17/22* (2006.01)
*A46B 15/00* (2006.01)
*A61C 17/34* (2006.01)

(52) U.S. Cl.
CPC ........ *A61C 17/221* (2013.01); *A46B 15/0002* (2013.01); *A46B 15/0004* (2013.01);
(Continued)

(58) Field of Classification Search
CPC .............. A46B 15/0038; A46B 15/001; A46B 15/0002; A46B 15/00; A46B 15/0004;
(Continued)

(56) References Cited

U.S. PATENT DOCUMENTS 6,536,068 B1    3/2003 Yang
6,731,213 B1    5/2004 Smith
(Continued)

FOREIGN PATENT DOCUMENTS

CN    1503640 A    6/2004
CN    104523000 A    4/2015
(Continued)

OTHER PUBLICATIONS

Schechner, Sam, "These Gadgets Aim to Put Some Teeth Into the Internet of Things," The Wall Street Journal, vol. CCLXIII, No. 50, Mar. 3, 2014 (2 pages).
(Continued)

*Primary Examiner* — Mark Spisich
(74) *Attorney, Agent, or Firm* — Nixon Peabody LLP

(57) ABSTRACT

Tooth brushing monitoring system is disclosed that includes a toothbrush with sensors and a base station. The sensors record data regarding the quality, quantity and location of brushing and the system can analyze the data to provide feedback on the quality of brushing. This feedback provides motivation for users to increase their brushing habits, leading to a decrease in plaque, tooth decay and gingivitis.

17 Claims, 6 Drawing Sheets

(52) U.S. Cl.
    CPC ......... *A46B 15/0006* (2013.01); *A61C 17/34* (2013.01); *A46B 15/001* (2013.01); *A46B 15/0008* (2013.01); *A46B 15/0012* (2013.01); *A46B 15/0038* (2013.01); *A46B 2200/1066* (2013.01); *A61C 17/224* (2013.01)

(58) Field of Classification Search
    CPC ............ A46B 15/0006; A46B 15/0008; A46B 15/0012; A61C 17/22; A61C 17/221; A61C 17/222; A61C 17/225
    USPC .............................. 15/22.1, 22.2, 105, 106
    See application file for complete search history.

(56) References Cited

U.S. PATENT DOCUMENTS

| | | |
|---|---|---|
| 6,786,732 B2 | 9/2004 | Savill |
| 7,450,002 B2 | 11/2008 | Choi |
| 8,175,840 B2 | 5/2012 | Hwang |
| 9,101,329 B2 | 8/2015 | Ertl |
| 10,925,387 B2 | 2/2021 | Nishiura |
| 2002/0183959 A1 | 12/2002 | Savill |
| 2005/0256675 A1 | 11/2005 | Kurata |
| 2007/0074359 A1 | 4/2007 | O'Lynn |
| 2007/0265495 A1 | 11/2007 | Vayser |
| 2007/0270221 A1 | 11/2007 | Park et al. |
| 2009/0215015 A1 | 8/2009 | Chu |
| 2009/0291422 A1 | 11/2009 | Puurunen et al. |
| 2009/0317770 A1 | 12/2009 | Gatzemeyer et al. |
| 2010/0145654 A1 | 6/2010 | Hwang |
| 2010/0319145 A1 | 12/2010 | Neyer et al. |
| 2010/0323337 A1 | 12/2010 | Ikkink et al. |
| 2011/0010876 A1 | 1/2011 | Iwahori et al. |
| 2011/0275424 A1 | 11/2011 | Schmid et al. |
| 2011/0313825 A1 | 12/2011 | Joachim et al. |
| 2012/0036657 A1 | 2/2012 | Iwahori et al. |
| 2012/0246858 A1 | 10/2012 | De Vries et al. |
| 2012/0251975 A1 | 10/2012 | Iwahori |
| 2012/0266397 A1 | 10/2012 | Iwahori |
| 2012/0310593 A1 | 12/2012 | Bates |
| 2013/0125326 A1 | 5/2013 | Schmid et al. |
| 2013/0125327 A1 | 5/2013 | Schmid et al. |
| 2013/0132388 A1 | 5/2013 | Patel |
| 2013/0137074 A1 | 5/2013 | Meriheinae et al. |
| 2014/0033034 A1 | 1/2014 | Patel |
| 2014/0065588 A1 | 3/2014 | Jacobson et al. |
| 2014/0165311 A1 | 6/2014 | Donegan |
| 2015/0044629 A1 | 2/2015 | Wang et al. |
| 2015/0374454 A1 | 12/2015 | Beerstecher et al. |
| 2016/0143718 A1 | 5/2016 | Serval et al. |
| 2017/0116665 A1* | 4/2017 | Alzahrani .......... G06Q 30/0641 |

FOREIGN PATENT DOCUMENTS

| | | |
|---|---|---|
| DE | 10045067 A1 | 4/2002 |
| EP | 3010441 A1 | 4/2016 |
| HK | 1224165 A1 | 8/2017 |
| JP | 2008-543418 A | 12/2008 |
| JP | 2009240760 A | 10/2009 |
| JP | 2014-204789 A | 10/2014 |
| WO | 2002083257 A2 | 10/2002 |
| WO | 2006137648 A1 | 12/2006 |
| WO | 2009107047 A1 | 9/2009 |
| WO | 2010134050 A1 | 11/2010 |
| WO | WO 2012020165 A1 | 2/2012 |
| WO | 2012034786 A1 | 3/2012 |
| WO | 2014202250 A1 | 12/2014 |
| WO | 2014202438 A1 | 12/2014 |
| WO | 2016180929 A1 | 11/2016 |
| WO | 2017157411 A1 | 9/2017 |

OTHER PUBLICATIONS

Third-Party Observations Under Article 115 EPC in European Patent Application No. 14716781.1, dated Mar. 23, 2018 (5 pages).
Third-Party Observations Under Article 115 EPC in European Patent Application No. 14716781.1, dated Apr. 11, 2018 (18 pages).
Third-Party Observations Under Article 115 EPC in European Patent Application No. 14716781.1, dated Apr. 24, 2018 (36 pages).
Article 94(3) Communication from the Examining Division in European Patent Application No. 14716781.1, dated May 2, 2018 (6 pages).
International Search Report and Written Opinion for PCT/EP2014/056844 dated Aug. 1, 2014, 8 pages.
International Preliminary Report on Patentability for PCT/EP2014/056844 dated Dec. 17, 2015, 11 pages.
International Search Report and Written Opinion for PCT/EP2016/060715 dated Jul. 26, 2016, 8 pages.
International Search Report and Written Opinion for PCT/EP2016/055407 dated Nov. 25, 2016, 13 pages.
Barras, Computerized Toothbrush makes Oral Hygiene a Game, New Scientist, retrieved from: [https://www.newscientist.com/article/dn13598-computerised-toothbrush-makes-oral-hygiene-a-game/], 2008.
Chang et al., Playful Toothbrush: UbiComp Technology for Teaching Tooth Brushing to Kindergarten Children, CHI, 2008, 10 pages.
Chinese Office Action in Chinese Patent Application No. CN 201680041379.8, dated Feb. 19, 2020.

* cited by examiner

TOOTHBRUSH SYSTEM WITH MAGNETOMETER FOR DENTAL HYGIENE MONITORING

CROSS-REFERENCE TO RELATED APPLICATIONS

This application is a National Phase of International Application No. PCT/EP2016/060715, filed May 12, 2016, which designated the U.S. and that International Application was published under PCT Article 21(2) in English. This application claims priority to U.S. Provisional Application No. 62/161,149, filed May 13, 2015, the content of which is incorporated herein by reference in its entirety.

FIELD

The present invention relates to methods and devices for monitoring tooth brushing activities.

BACKGROUND

According to the CDC, although preventable, tooth decay is the most common chronic disease of children aged 6-11 (25%) and adolescents aged 12 to 19 years (59%). Also 28% of adults aged 35 to 44 have untreated tooth decay. A bacterial biofilm called plaque that develops on teeth contributes to tooth decay and gingivitis. However, plaque can be removed by brushing at least once a day for two minutes and preferably twice a day and therefore prevent or mitigate tooth decay. Atlin T and Horecker E., "Tooth Brushing and Oral Health: How Frequently and When Should Tooth Brushing be Performed" Oral Health & Prevention Dentistry, 2005 3 (3): 135-140. Additionally, research shows that children continually miss the same areas during brushing which leads to isolated buildups of plaque on certain teeth. Accordingly, more important than the length of time of brushing, is the efficacy of the tooth brushing. Additionally, dental health education only has been shown to generally only have a small and temporal effect on plaque accumulation. Atlin T and Horecker E., "Tooth Brushing and Oral Health: How Frequently and When Should Tooth Brushing be Performed" Oral Health & Prevention Dentistry, 2005 3 (3): 135-140. Furthermore, many toothpastes incorporate fluoride with promotes the regrowth of tooth enamel to prevent cavity formation. According to the American Dental Association, the compliance with tooth brushing is quite low. For instance, only 49% of men and 57% of women brush their teeth twice a day.

SUMMARY

Accordingly, there exists a need for a dental system that could increase a user's compliance of tooth brushing with dentist recommend regimes in order to decrease cavities, gum disease, and other dental complications from lack of brushing. The present disclosure provides systems and methods for monitoring toothbrush usage and electronically providing feedback and other incentives to the user to increase compliance.

The system allows the recording of teeth brushing activities and the analysis of those activities. It allows the creation of a service that provides feedback and incentives for a user of the tooth brush system. The toothbrush records brushing data through sensors during its use. In some embodiments, the data is analyzed and compared to reference data. Through a feedback output device, the user receives advice about the use of the system and incentives and other feedback designed to increase compliance with recommended usage regimes. For example, the system may implement a gamification process to increase the motivation to use the hygienic device.

In some embodiments, the invention relates to a method for a new way to use a toothbrush by informing a user about his/her brushing practices for example by wireless integration with a mobile telecommunication device having a display screen apart. The electric tooth brush may also communicate data wirelessly to a base station which may then send the data to a network for analysis on cloud servers or wirelessly to a mobile device. The mobile telecommunication device may be a mobile phone, a microcomputer with telecommunication means, a tablet computer with telecommunication means. In other embodiments, the data may be wirelessly sent to the base station and then uploaded to servers for later accessing by computing devices that include both mobile and non-mobile computing devices.

The toothbrush system may include a toothbrush with sensors and a base station, the base station physically supporting the toothbrush when it is not handled by a user. The electronic toothbrush may include (a) signal processing circuitry, (b) memory, (c) base station interface for exchanging data between the toothbrush and base station, (d) a power supply circuit that may include a rechargeable battery or capacitor, and (e) a controller. The base station may include (a) a network interface for exchanging data between the internet or other network and the base station, and (b) a recharging circuit for recharging the toothbrush's rechargeable battery which may optionally also act as a magnetic transmitter in connection with a magnetometer sensor in the toothbrush. In other embodiments, the system may not include a base station and signals may be sent wirelessly directly to a mobile phone or other wireless terminal.

Electrical Configuration

The controller of the toothbrush may be configured to coordinate the data exchange between the toothbrush and the base station and/or mobile device for the transfer of the processed signals from the sensors to the base station. In some embodiments, the toothbrush system 100 may include signal conditioning circuits for the processing of signals from the sensors, a memory for the storing of the processed signals from the sensors, a toothbrush interfacing circuit for allowing information exchanges between the toothbrush and the base station, a toothbrush power supply circuit for powering the sensors and the circuits of the toothbrush, including a rechargeable electric source of the battery and/or capacitor type, and a controller circuit for directing the operation of the tooth brush electronics.

The base station may include the following circuits: a data exchange circuit for exchanging data with a network, a base station interfacing circuit adapted to exchange information with the toothbrush, a base station power supply circuit for powering the base station circuits and for recharging the rechargeable electric source of the toothbrush when it is received in the base station. The base station may also include a magnetic field transmitter, which may be the power supply or recharging circuit, or may be a separate magnetic field transmitter. The controlling circuit may be configured to store in memory the processed signals from the sensors upon the detection of the user using the toothbrush, and to command, when the toothbrush is received in the base station, the data exchange circuit of the base station to transfer the stored signals from the sensors, through the interfacing circuits of the toothbrush and of the base station, over the network. In some embodiments, raw data from the sensors may be stored and sent over the data exchange circuit for processing at the base station or processing elsewhere.

Physical Design

In some embodiments, the toothbrush may include an electronic motor, for vibrating the toothbrush head during brushing. Additionally, the head of the toothbrush that includes the bristles, may be removably connectable to a body or handle of the toothbrush, and be configured for the interchangeability of multiple heads. The toothbrush may be waterproof. In some embodiments, a base station may be configured to physically receive only one, two, three, four or five, or additional numbers of toothbrushes.

Sensors

The sensors of the toothbrush may be one or more of: i) a pressure sensor (10) motion sensors (11), or ii) any other type(s) of sensors capable of measuring brushing activities of the toothbrush, such as an accelerometer or an inertial sensor. This may include accelerometers, magnetometers, and gyroscopes. In some embodiments, the toothbrush may include at least a pressure sensor and at least one acceleration sensor. In some embodiments, the processed signals from the sensors are transferred to the server via a network through the base station. Additionally, processed signals from the sensors are transferred to the server via a network through the mobile device.

Computing Devices

In some embodiments the mobile telecommunication device is a mobile phone, a microcomputer with telecommunication means, a tablet computer with telecommunication means, or any other means having display means for displaying information related to a tooth brushing activity and having circuits for a connection to the global network and for communicating with the global network. For example, the mobile device can typically be a mobile phone, but may also consist of other portable mobile PDA device types ("PDA") or otherwise, with capacity of radio communication or, even, a microcomputer laptop or desktop with telecommunication means, a tablet computer with telecommunication means. In other embodiments, the signals are viewable on a stationary computable device that accesses the data via cloud servers.

Signal Processing

The controller of the toothbrush is configured to store processed signals from the sensors in memory. In some embodiments, the controller may instead store raw data from the sensors in the memory for sending to a base station or other component of the system where the raw sensor data may be processed. The controller coordinates the acquisition, processing, and storage of signals once the controller or other processor in the system determines a user initiates brushing. In other embodiments, the controller may coordinate the storing and sending of raw data for processing elsewhere. Next the controller may be configured to send the stored signals wirelessly to the base station or the computing device for further processing or initial processing, display, or analysis.

Signal processing may include filtering, amplification, conversion, signal conversion from analog to digital, digital filtering, digital data compression, digital data reduction, digital data computation, and digital data conversion. This may be performed at several different aspects of the system including the toothbrush, the base station, an associated mobile phone a server linked by a network to the system and other locations.

Data Protocols and Transfer

In some embodiments, the toothbrush interface circuit and the base station interface circuit are wireless circuits, for example: WiFi®, Bluetooth®, GSM/UMTS and derivatives. In some embodiments, the data exchange circuit of the base station uses a wireless protocol, for example: WiFi®, Bluetooth®, GSM or others. In some embodiments, the toothbrush may have a unique identifier, to allow the pairing of a mobile device and the toothbrush.

In other embodiments, the toothbrush interface circuit and the base station interface circuit may utilize wired connections. For example, the data exchange circuit connection to the network is wired. Identification data may be incorporated in the data packets that include the stored signals from the sensors that are sent over the network. The identification may include a serial identity number of the toothbrush or head, a serial identity number of the base station, or a network address of the base station. Additionally, tooth brushing monitoring data obtained during the measuring step may be time-stamped using data from a toothbrush internal clock.

In other embodiments, the network comprises at least a wireless local area network (WLAN) and during the step of communication, the toothbrush transmits data to said mobile device via said WLAN. The WLAN may operate according to a communication protocol selected from the Wifi or Bluetooth protocols. A mobile or other computing device may also be in communication with the local wireless local area network and in the communication step, the tooth brush transmits said data to the mobile device via said wireless LAN.

The LAN may include a server that communicates with at least the toothbrush, and in the communication step, the toothbrush may transmit said data to the mobile device by means of the server. The telecommunication network may further comprise a network of separate remote wireless LANs, the server communicating with at least one server via said remote network, the mobile device also communicating with said server via the remote network.

The information exchanged between the toothbrush and the base station through the interfacing circuits may include data or commands, the data including stored, processed signals from the sensors or raw data from the sensors. Information may be transmitted from the toothbrush to the base station and, conversely, from the base station to the toothbrush, as needed. The data can also be a program or software update to store and/or execute by the toothbrush. For example, updates and new firmware may be wirelessly downloaded and installed on the toothbrush.

Cloud Server or Local Network Processing of Data

In some embodiments, the system includes a server and the stored, processed signals from the sensors or raw data from the sensors are transferred over the network to said server, the server including storing means for the transferred processed signals and including computational components under the control of a program or software instructions. The program has instructions that are configured to send, at the end of the transfer, an erase command over the network to the toothbrush to erase the signals stored on the toothbrush that have been transferred to the server. The server may also determine the location of the tooth brush using geolocation capabilities of the remote network and/or of the mobile device.

The server includes memory for storing a history of the successive transferred stored and processed signals from the toothbrush sensors and/or raw data from the sensors. The program for controlling the computational components of the server includes software instructions for analyzing and comparing the stored and processed signals and to provide computational results from said analysis and comparison. The program for controlling the computational components of the server may include instructions for making the results of the analysis available to a variety of computing devices, including a mobile or stationary device, by accessing the server through an internet page or other variety of methods. The computational analysis from the server may be transferred or downloaded directly to a computing device via a network link 35, which may be made through a dedicated communication equipment POA link 34 to the base station. Accordingly, the computational results from the server are transferred to the mobile device via a network through a dedicated communication equipment POA, and then to the base station and/or the toothbrush via links 33, 31, and 32. When the tooth brush is operative and communicating with the server, said server can update the software and/or the parameters running and/or used in the toothbrush. Similarly, the server can update the application or parameters related to the toothbrush and which is running on the mobile device.

User Profile

The system may include a stored user profile associated to the tooth brushing activity and its related data comprises the age, size and gender of the user. During or after the step of monitoring tooth brushing activities, the toothbrush, mobile device, or server automatically seeks to match the user with at least one user profile using at least one predetermined rule depending on the user profile and of past data. If the user is not a regular user of the toothbrush, said user identifies him/her as a guest on the mobile device.

In a step of user identification, a specific user may be associated with the toothbrush and presumed to be the user. If multiple users for a given toothbrush are utilized, to associate a user with a brushing activity at least in the toothbrush and possibly in the mobile device and/or the server at least for reference purposes for those last two.

Data Output

In some embodiments, the toothbrush transmits data in real time to the mobile or other computing device, and in the display step, the computing device displays in real time on the screen, information related to said data, for example the instantaneous progress of a user for a brushing episode in progress.

Calibration/Initialization

In some embodiments, the toothbrush may be calibrated, either in the factory or by the user or both. If a calibration step is performed by the user, the user can be guided in this process by information given by e.g. the display of the mobile device.

In a step of initialization, the system may allow for the selection of the desired local wireless network or mobile device. This can be done automatically or with the help of the user, and these operations correspond to a network pairing between the elements of the system which communicate between them. In some embodiments, the toothbrush may include at least a pressure sensor, at least one acceleration sensor, signal conditioning circuits for the processing of signals from the sensors, a memory circuit for the storing of the processed signals from the sensors, a toothbrush interfacing circuit for allowing information transfer between the toothbrush and a base station, a toothbrush power supply circuit for powering the sensors and the circuits of the toothbrush, said toothbrush power supply including a rechargeable electric source of the battery and/or capacitor type, and a controlling circuit for the operation of the toothbrush circuits. Preferably, the controlling circuit is configured to store in the memory the processed signals from the sensors upon the detection of the user using the toothbrush, and to command, when the toothbrush is received in a base station, the data exchange circuit of the base station for the transfer of the stored, processed signals from the sensors, through the interfacing circuits of the toothbrush and of the base station, over a network.

According to the invention, the base station includes a data exchange circuit with a network, a base station interfacing circuit adapted to exchange information with a toothbrush according to the invention, a base station power supply circuit for powering the base station circuits and for recharging the rechargeable electric source of the toothbrush when it is received in the base station.

From another point of view of this same invention, the invention provides a system and also a method using the system for monitoring tooth brushing activities, allowing communications with a mobile communication device having a display and information entry means, the toothbrush and the mobile device communicating both by radio with a telecommunications network, said telecommunications network being adapted to make communicate at least the mobile device with at least one further telecommunications device, the method comprising the steps of: (a) at least one tooth brushing activity monitoring step in which the toothbrush performs at least one measurement indicative of at least the brushing activity of the user, (b) at least one stage of two-way communication during which: i) a user enters information in the mobile device, and the mobile device transmits said information to the toothbrush through the telecommunication network, and ii) the toothbrush transmits to the mobile device, the data according to said tooth brushing activity monitoring measurement, through the telecommunications network, and (c) at least a display or feedback step in which the mobile device displays on its screen information based on tooth brushing activity monitoring data transmitted in the communication step. The displayed information may be representative of an output of a computation done on the transmitted data, said computation being done in the mobile device or in a server.

The present discloses provides a product and service which improves the use and/or motivation for a user to brush their teeth. Feedback is provided through an output device linked with the system. The system provides a toothbrush including sensors which monitor a user's brushing activities and provides feedback related to the brushing to the user. In some embodiments, a server may provide applications that use and process the data received from the sensors to provide output data relating to the quality of the brushing and other analysis. Finally, the applications running on the server may process this output data to provide feedback to the user to provide a playful/gameful dimension to increase the motivation to brush the user's teeth.

BRIEF DESCRIPTION OF THE DRAWINGS

The invention will now be described in relation to an exemplified embodiment and to the following Figures.

DETAILED DESCRIPTION

Figure 1:
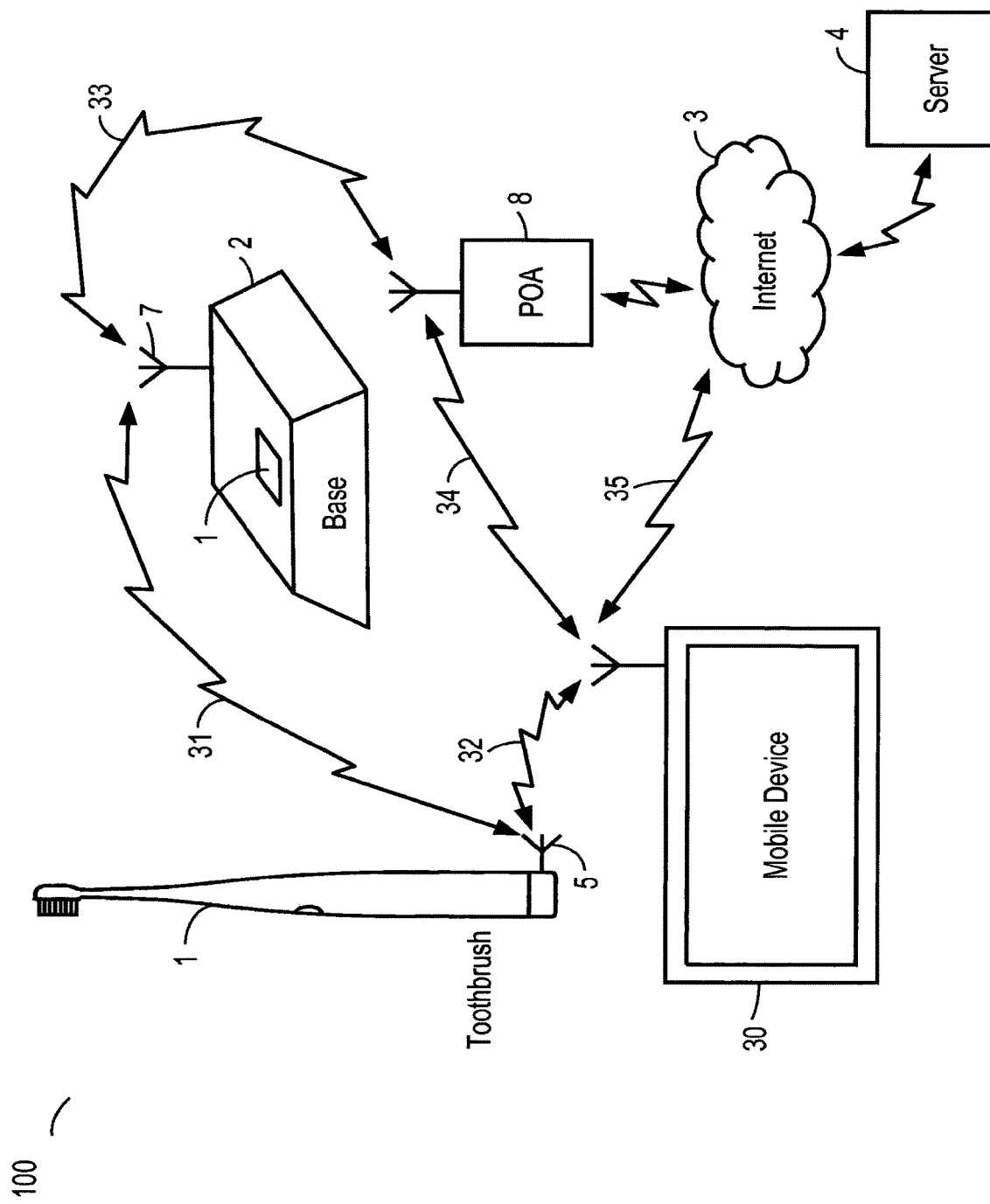
FIG. 1 which is a schematic view of the system of the invention.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

FIG. 1 illustrates an overview of the disclosed toothbrush monitoring and feedback system 100 that includes: a toothbrush 1 equipped with sensors, a base station 2 for receiving and charging the toothbrush 1, a mobile device 30 that wirelessly receives/sends data, a dedicated wireless link POA 8, a server 4 and a network 3 for transferring the information from the server or between other various components of the system 100.

Data Communication

The toothbrush 1 has an antenna 5 and transceiver means for radio communication to a compatible complementary antenna 5 and transceiver means of the base station 2 through a radio link 31. The radio-communication link 31 may be for example WiFi or GSM or Bluetooth or their derivatives or other proprietary protocols.

In another embodiment, antennas and transceiver means are replaced or completed by wired connections or connectors to allow the exchange of information between the toothbrush 1 and the base station 2. Wired connectors may also provide electric power supply from the base station to the tooth brush for recharging a rechargeable electric source of the latter. In another embodiment, the electric power supply from the base station to the tooth brush is provided with electromagnetic induction circuitry.

The base station 2 may be powered through a power cord. The base station 2 may alternatively be powered by a rechargeable battery which is charged from time to time with a battery charger powered by the power supply grid. The base station 2 has a receiving slot for physically supporting and storing the tooth brush when it is not used by a user.

The base station 2 includes a data exchange circuit, for communicating data with a network 3, for example the internet. Data may be transferred using a radio-communication link 31, as illustrated in FIG. 1, with the antenna 5 of the base station 2 and with the antenna 5 of a dedicated communication equipment 8 or POA, connected to the network 3. In other embodiments, transfer of data between the base station 2 and the network 3 are performed through a wired link, for example ADSL.

The antenna 5 and transceiver means of the toothbrush 1 is also compatible with radio communication means of a mobile device 30 over a radio link 31. The radio-communication link 31 is for example WiFi or GSM or Bluetooth or their derivatives or other suitable protocols. In some embodiments, radio links 31 are short range, local, radio communication links or a radio link 35 such as the ones used in cellular or other mobile phone systems (GSM and derivatives for example).

The mobile device 30 is also able, via its radio communication circuits, to exchange data on a radio link 31 through the dedicated communication equipment 8 or POA, on the network 3. In addition or alternatively, the mobile device 30 is able to exchange data on a radio link 35 directly on the network 3.

A server 4 is connected to the network 3 by any suitable means. Server 4 is defined broadly to include computing devices capable of storing and computational operations for example on the "cloud" in a computing network. The server 4 may include storage devices, for instance memory, hard disk drives, flash memory, or other storage devices and includes computational means under the control of a program. For the transfer of data, the toothbrush controlling circuit uses a predetermined server 4 address of the network 3. This predetermined address may be stored initially in the toothbrush 1 and/or updated later through the network 3. The transfer of data between the toothbrush 1 and server 4 may be performed: a) each time the toothbrush 1 is replaced in the base station 2 in a batch configuration, b) at the direction of the user or the server 4, for example by user action initiating the transfer using the interface of the mobile device 30 or a web page accessing the server 4 or c) in real time when toothbrush 1 activities are detected, or d) the toothbrush 1 is removed from the base station 2 or e) at other suitable intervals.

System Circuit Design and Network Architecture

Figure 2:
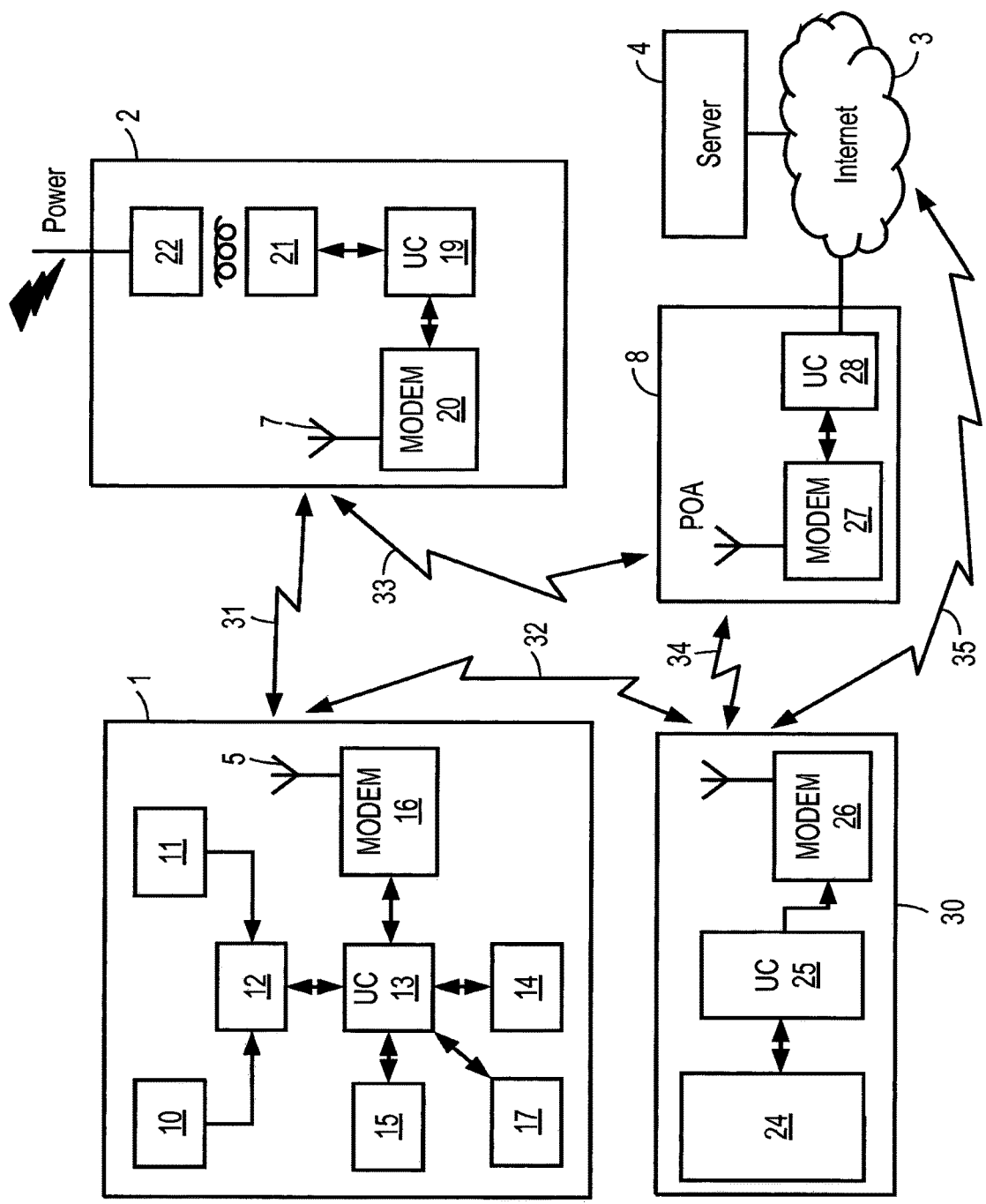
FIG. 2 is a diagrammatic view of the toothbrush and of the base station of the system.

As illustrated in FIG. 2, the toothbrush 1 may include a pressure sensor 10 and at least one motion sensor 11. The pressure sensor 10 detects force applied on the brushing side of the toothbrush 1 when a user applies the bristles to their teeth. A motion sensor 11 may be provided for detecting motion on any or all three of the orthogonal axes of the toothbrush 1, or a motion sensor may be able to detect accelerations or other motion characteristics in all three axes. The signals output by the sensors are processed by a signal conditioning circuits 12. Examples of signal conditioning include: frequency and noise filtering, amplification, conversion, digital signal processing, and other techniques to optimize the detected signals for analysis.

The processed signals or raw data from the sensors are then stored in memory 14 as determined by a controller 13 which may be a digital signal processor, microcontroller, or other processing component and which operations are controlled by a program 15. The memory 14 may be included in the toothbrush 1 or on a server 4 or other component of the system 100. A program 15 may be updated through a toothbrush 1 interfacing circuit 16, a modem for radio communication, and its antenna 5 (and/or connector in case of contact/wired interface) or other interfaces of the toothbrush 1. More generally, the toothbrush interfacing circuit 16 allows information exchanges between the toothbrush 1 and the base station 2 when the radio link 31 is established (and/or connectors of the tooth brush and of the base station are mated together). The toothbrush 1 may contain a power supply circuit for powering the sensors and the circuits of the toothbrush 1 and it can include a rechargeable electric source 17.

The base station 2 may include a base station interfacing circuit 20, a modem for radio communication, with an antenna 5 (and/or connector) to exchange information over link 31. In addition, the base station interfacing circuit 20 is able to establish a radio link 31 with the dedicated communication equipment 8, for communication with the network 3. The base station 2 may utilized a power supply converter 22 which is regulated 21 to provide appropriate voltage and current to the base station circuits. Electrical connections (not illustrated) for providing charging current to the toothbrush 1 from the base station 2 may be provided. In some embodiments, the base station 2 may include a recharging circuit for recharging a batter or power supply of the toothbrush, through inductive charging or a direct electrical connection.

The base station 2 may also include a magnetic field transmitter 110 that emits a magnetic field that may be sensed by an associated magnetometer or other magnetic field sensor 11. The magnetic field transmitter 110 may be provided by utilizing the charging circuits or other circuits that already exist in the base station 2. For example, the base station 2 may have a recharging coil that could also serve as a magnetic field transmitter 110. The recharging coil may be fixed and in a known orientation, so as to create a magnetic field of known strength and polarity orientation. In some embodiments, the base station 2 may include a recharging coil that generates a magnetic field with a polar axis situated in a horizontal or vertical plane. In some embodiments, this may be a single axis magnetic field transmitter 110, such as in the case of a single axis recharging coil. In other embodiments, 2 or 3 axis magnetic field transmitters 110 may be incorporated into the base station 2. This will advantageously allow for a fixed magnetic field(s) of known orientation so that a magnetometer 11 on the toothbrush 1 may sense the strength and polarity of the magnetic field(s) in order to provide information regarding the position and orientation of the toothbrush 1, or the relative changes in position and orientation.

In some embodiments, the base station 2 is passive and its circuits are under the control of the controller 13 of the tooth brush 1 when they are communicating together, specifically when the link 31 is of the wired/contact type with connectors. In the embodiment represented on FIG. 2, the base station has a controller 19 which controls its operations.

The dedicated communication equipment 8 may include a radio modem circuit 27 and the appropriate electronics for communicating with network 3. The dedicated communication equipment 8, is able to establish a radio link 31 with the base station 2 and/or a radio link 31 with the mobile device.

The mobile device 30 includes at least a radio modem 26 for establishing a radio link 31. The operations of the mobile device 30 are under the control of a controller 25, namely a central processing unit or μC, and of a program 15. The mobile device 30 includes an output means such as a display screen and an input means such as a virtual or material keyboard. Preferably, the input and output means of the mobile device 30 are used in the system to input information and to display information, notably the results of computations performed by a server.

The program of the computational means of the server 4 allows storage of signals received from the toothbrush 1. Additionally the server 4 may analyze the data from the sensors to produce feedback and motivational data regarding the user's performance in brushing their teeth. These results may be accessible to the user on an internet page hosted by the server 4 or transferred to another webserver for hosting. In a different embodiment, the previous operations and computations are done fully or partially in the mobile device 30, the server 4 being used for general monitoring.

It should initially be understood that the disclosure herein may be implemented with any type of hardware and/or software, and may be a pre-programmed general purpose computing device. For example, the system may be implemented using a server, a personal computer, a portable computer, a thin client, or any suitable device or devices. The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present invention, but merely be understood to illustrate one example implementation thereof.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a "data processing apparatus" on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Toothbrush Design

Figure 3A:
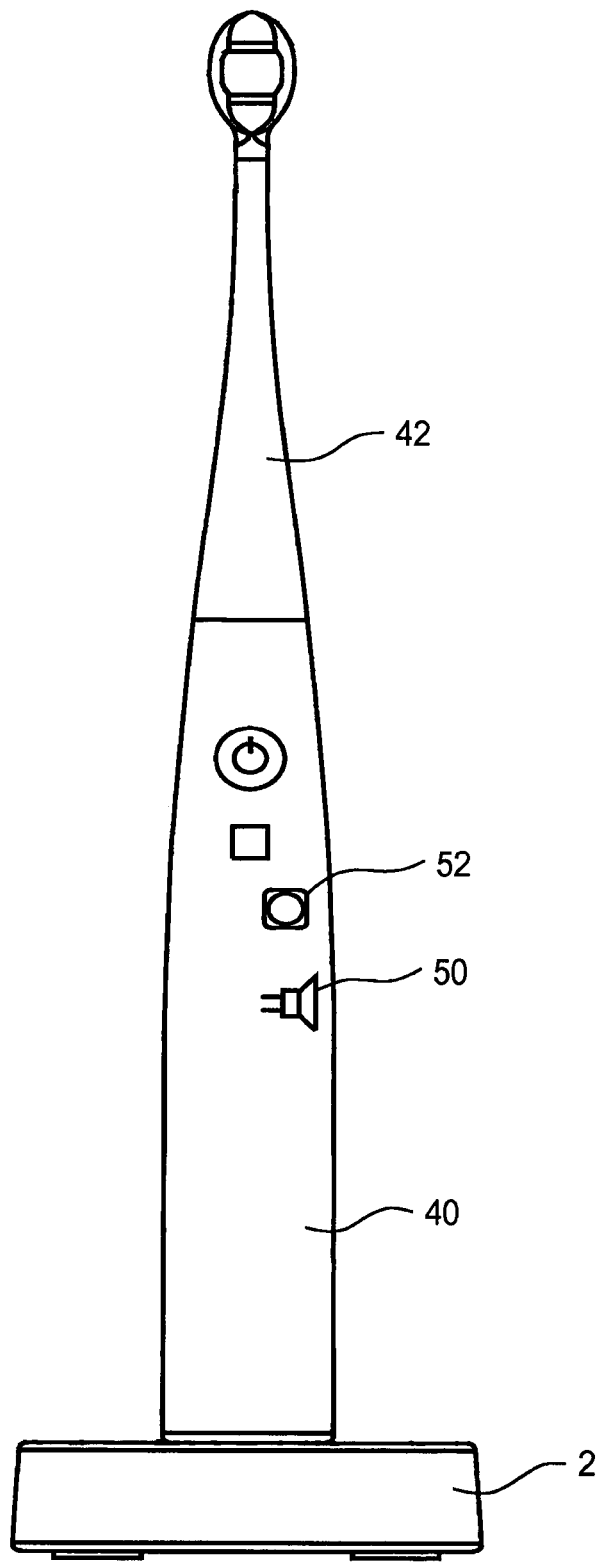
FIG. 3A is a perspective view of a toothbrush and head in accordance with one embodiment of the present invention.
Figure 3B:
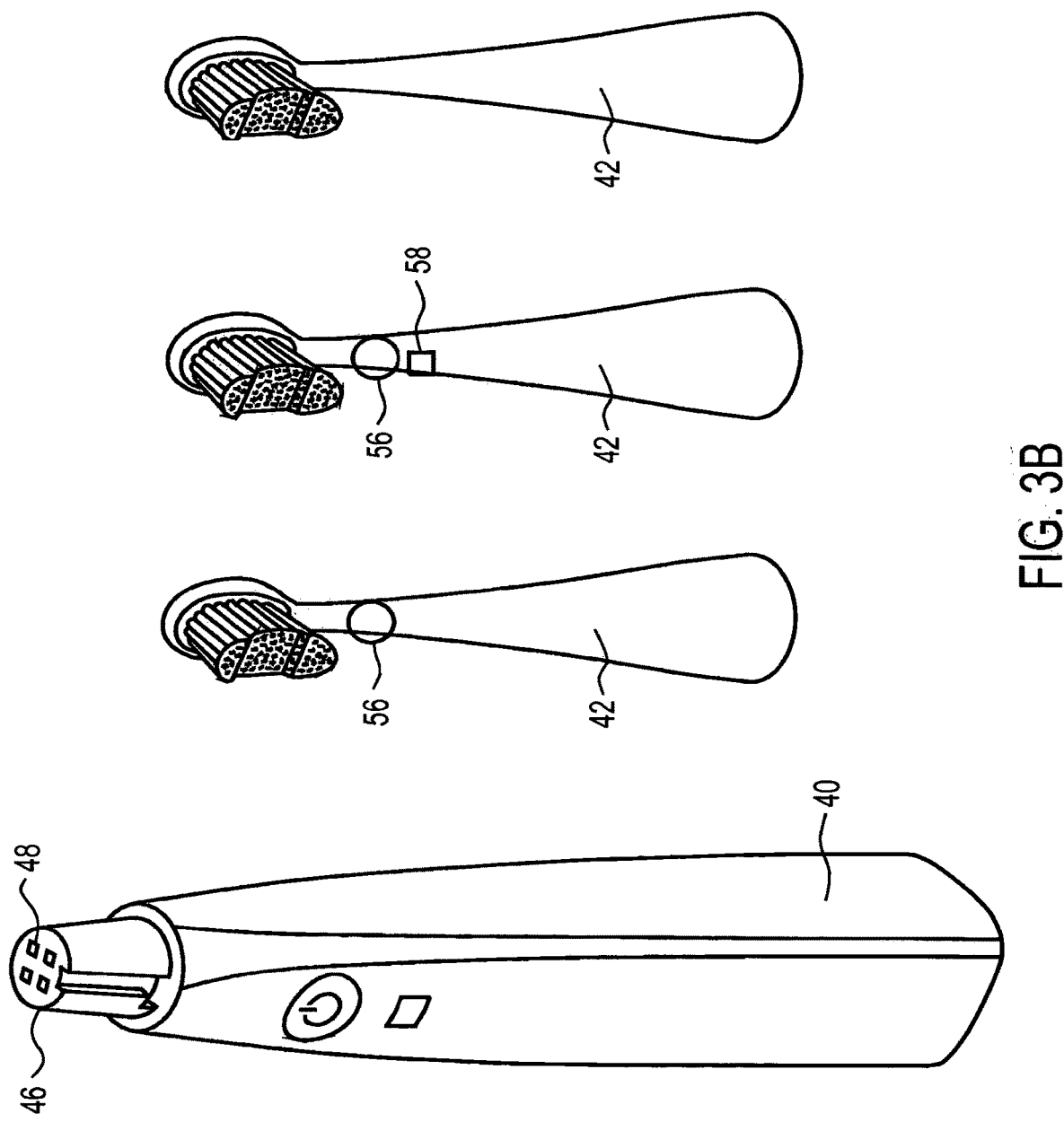
FIG. 3B is a perspective view of a toothbrush handle and replaceable heads that may be attached to a head interface.

As illustrated in FIG. 3, the toothbrush 1 includes a handle 40, and a head 42 that may be removably connectable to the handle 40. The handle 40 may contain a motor that is mechanically connected to the head 42 and when activated vibrates or moves the head 42 in manner that brushes a user's teeth when placed inside the mouth. The handle 40 includes a head interface 46 that removably attaches various heads 42 to the handle 40. The head interface 40 contains leads 48 for both data and power transfer to various heads 42. For example, certain heads 42 may include sensors that require power and data transfer, and therefore power can be routed from the handle's 40 power source to the head 42 through leads 48 that form a connection with the head 42 at the head interface 46. The may be various numbers of leads 48 that form the connection on the head interface 46, for instance there may be two leads 48 for power, and two leads 48 for data, three leads 48 for power, three leads 48 for data, and other various numbers of leads. In some embodiments the head interface 46 will form a watertight seal with the head 42 to prevent water from entering the interface and interfering with the electrical leads 48 power and data transfer.

In some embodiments, the majority of the circuitry and costly components can be contained inside the handle 40 as opposed to the head 42, which may be disposable after a certain number of uses. This will minimize the cost of the replacement heads 42. For example, in some embodiments, the battery, controller 13 may be contained in the handle 40, and any sensor probes and circuitry to connect the sensor probes may be contained in the head 42. In other embodiments, the head 42 may contain no circuitry or electrical components and will only provide a mechanical brushing function by supporting the bristles.

The toothbrush 1 may also include a speaker 50 and various visual indicators 52 to provide audio and visual feedback to the user. For example, the handle 40 may contain a speaker 50 for playing music, substantive feedback, motivational phrases, remaining time elapsed, recommendations on brushing pressure, on whether certain quadrants have not been adequately brushed, an announcement for completion of brushing, etc. Additionally, the toothbrush 1 may contain any number of visual indicators 52, for providing substantive feedback on the brushing including time elapsed, a LED indicator for when brushing is complete, warning indicators for brushing inappropriately, including indicators for whether each quadrant has been addressed. In other embodiments, the toothbrush 1 may also utilize osteophony to convey audio messages to the user.

Sensors

The toothbrush 1 may incorporate various sensors that detect certain attributes of brushing that may be analyzed to provide various feedback and other motivational information to the user. For example, the toothbrush 1 may incorporate various motion sensors 11 to determine the quality of the brushing with respect to certain quadrants of the mouth or even individual teeth. The motion sensors 11 may include gyroscopes, accelerometers, magnetometers, and other various sensors capable of detecting positions, movement, and acceleration. These various motion sensors 11 may be incorporated either in the handle 40 or the head 42. However, it may be advantageous to put the motion sensor 11 in the handle 40 in embodiments where the head 42 and therefore any acceleration or other motion sensor would experience at lot of additional motion that may interface with detecting a position. In some embodiments, the magnetometers will sense a vector(s) of the earth's magnetic field. In some embodiments, a three-axis magnetometer will be used and in others a two or one axis magnetometer will be utilized.

A magnetic field generator may also be utilized to generate a known magnetic field with a known polarity that may be sensed by a magnetometer incorporated into the toothbrush 1. The magnetic field transmitter 110 may be placed inside the base station 2 which would already have a recharging coil and/or interfacing circuit 20 that may be utilized to produce a detectable magnetic field. In other embodiments, the magnetic field transmitter 110 may be a separate electronic component in the base station 2 or in a separate physical component entirely. In some embodiments, the magnetic field transmitter 110 would be in a stationary unit with a known orientation.

The toothbrush 1 may also incorporate various proximity sensors that detect the proximity of the toothbrush 1 to the mouth of a user. These may be incorporated at the head 42 or in the handle 40. The proximity sensors may be utilized to acquire additional positional information relevant to determining the brushing quality of the user.

Additionally, the toothbrush 1 may contain a pressure sensor 10 to determine whether the user is applying appropriate pressure in brushing their teeth. The pressure sensor 10 may be incorporated into the head 42 which may be more easily flexible or utilize simple pressure transducers or other components capable of measuring pressure.

In some embodiments, various heads 42 may incorporate a camera 56 that will detect various aspects of tooth quality that may or may not be related to brushing quality. For example, a camera 56 including a near infrared camera 56 may be able to be utilized on a toothbrush 1 to collect data indicative of demineralization or dental caries or dental decay. For example, the toothbrush 1 may utilize certain wavelengths that are particularly suited to detect these abnormalities, for instance in the 1300-1400 nm range. In some embodiments, the toothbrush 1 may also contain a light source 58 that will be focused towards the teeth during brushing and can be utilized by the camera to detect certain abnormalities.

Certain cameras 56 and potentially light sources 58 may also be implemented to detect levels of plaque on the teeth and changes in levels of plaque during brushing. In certain embodiments, infrared or near-infrared light sources 58 and an appropriate camera 56 that detects and records light in this wavelength range may potentially allow for the detection of plaques.

Program for Brushing Analysis and Feedback

The toothbrush's 1 various sensors may gather data relevant to the quality of brushing by a user or the overall dental health of a user's teeth. This data may then be processed using programs or applications installed in various portions of the toothbrush monitoring system 100. Accordingly, as described above, data from the sensors may be processed by a program executed by the toothbrush's 1 controller 13 or alternatively a processor on the mobile device 30 or the server's 4. The system's 100 processing and analysis of the data will result in output data representing feedback relevant to a user's quality of brushing. This feedback may be communicated through audio feedback through the toothbrush 1 speaker 50, visually on the toothbrush 1 indicators 52, or both on an associated mobile device 30 or when accessed on a website hosted or in communication with the server 4.

Figure 4:
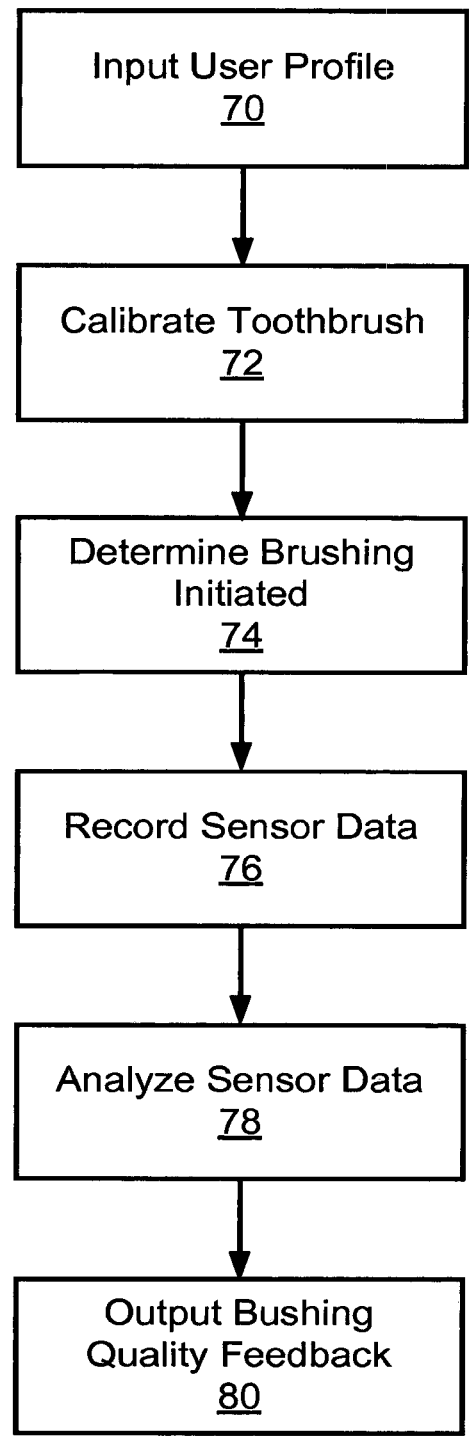
FIG. 4 is a flow chart illustrating an embodiment of a process utilized in the present disclosure to record brushing data and provide feedback to the user.

FIG. 4 illustrates an example of the process by which the toothbrush 1 evaluates the brushing quality of a specific user. Each the steps may not be required in a specific embodiment, but various combinations of these steps may be implemented in a toothbrush monitoring system 100. First, the user may input a user profile 70 into the toothbrush monitoring system 100, to allow the user to calibrate the toothbrush 72. In some embodiments, the toothbrush 1 may be calibrated at the factory, by the user or both. After calibration, the user may pick up the toothbrush 1 and begin brushing her teeth. The toothbrush would then determine that brushing is initiated 74, and start recording sensor data 76 during brushing. Then the toothbrush monitoring system 100 may analyze the sensor data 78 to output brushing quality feedback 80 to the user.

User Profile

Accordingly, first a user profile 60 may be entered 70 for each particular user of a certain toothbrush 1 or associated with a specific account stored on the server 4. Upon initialization for of a new toothbrush or new account on the server 4, a user may enter their information that may be utilized to determine optimal brushing times and characteristics. For example, a program 15 may first request a user's name, gender, height, weight, age, and certain questions on their dental history. The user profile 60 may then be associated with certain data recorded during use of the toothbrush by the user, including calibration data that is specific to certain toothbrushes 1 or is generic and can be applied to any toothbrush 1 connected to the system 100.

Detecting Usage

A tooth brushing monitoring system 100 may also determine whether usage has taken place and the number of usages per day. In some embodiments, the toothbrush detects motion data through motion sensors 11 and analyzes the data to determine whether usage has occurred, or whether the brush has been moved or usage is feigned. When motion indicative of usage is detected, the toothbrush 1 may store the positional and motion data in its memory 14 for later analysis. For example, this will prevent the recording of false positives, for example when a user moves the brush in a medicine cabinet, or from children circumventing the system by briefly shaking the toothbrush.

For example, movement indicating usage may be associated with a certain acceleration level and/or frequency that is characteristic of a particular user. In other embodiments, a user may push a button or switch on the toothbrush 1 to wake up the sensors on the device, which will then begin recording data. Accordingly, the toothbrush 1 will determine when brushing is initiated 74. In some embodiments, this will be performed automatically, for example, upon the detection of certain accelerations and frequencies. Accordingly, once the user picks up the toothbrush, the motion sensors 11 may begin recording the data 76 and sending it to any of the various controllers 13 in the system 100 to analyze it 78 for characteristics associated with brushing. For instance, the toothbrush 1 will generally be resting on its base 2 pointing upwards prior to use, in an orientation that would not be suitable for brushing by a user holding the toothbrush 1. Accordingly, once the user picks up the toothbrush 1, the toothbrush 1 will generally be rotated roughly 45 degrees to be held primarily horizontal during brushing. Accordingly, one threshold criteria for determining that brushing is initiated 74 would be whether the toothbrush 1 has been titled within a certain angle range indicating the toothbrush 1 is horizontal or near horizontal. This could be an angle range of 20 degrees, 5 degrees, 10 degrees, or other suitable ranges. Additionally, a series of calibration sessions may indicate a suitable range.

In other embodiments, the determination of whether brushing has initiated 74 and whether or not it has ceased may be performed by the system 100 using a statistical analysis of the motion data from motion sensors 11. This statistical analysis may be performed by correlating data from the motion sensors 11 to previous tooth brushing or calibration data, or data stored from other users. For example, after performing the analysis, a certain threshold of correlation of the motion data with previously recorded calibration data that is associated with usage may be determined that indicates brushing has initiated 74 or is in progress. Accordingly, once the user begins brushing, the system 100 may record that usage has been initiated 74 and record the data 76 in memory 14 until usage stops as brushing data, for instance after the correlation falls below a certain threshold. The analysis may utilize a fingerprint or signature type analysis that only compares relative movements. The signature may be determined based on the acceleration in certain axes, as the motion of brushing teeth is generally performed in a relatively rapid motion that is uncharacteristic of any other incidental movement of the toothbrush 1, for example, to put it back in the cabinet. Additionally, the frequency of the brushing may be monitored, as brushing is generally a rapid periodic motion, and therefore various bandpass frequency, low-pass, and Kalman filters may be used or other techniques to identify certain frequencies of interest and amplitudes in those frequencies that indicate brushing. These amplitudes in frequencies may be certain frequencies that reach a threshold amplitude, that are associated or determined to indicate a user is brushing. For example, a certain frequencies in horizontal or vertical axes may be required for the system 100 to determine brushing is initiated 74, or certain periodic accelerations that reach certain thresholds may be required for the system to determine brushing has initiated 74. In some embodiments, this may a frequency of 1-5 Hz. Once the data analyzed by the controller 13 falls below a certain threshold that indicates use, the system 100 may stop recording data or determine that brushing has stopped.

In addition to statistical analysis, the system may detect movement indicating usage or actual brushing by using filtering and threshold analysis. For example, the system 100 may first filter the data from the motion sensors 11 to pass frequencies only in a certain band (as brushing is periodic) and monitor those frequencies to detect when the for one the signal in that reach a threshold for at least a certain number of cycles or duration to determine the user is brushing. For example, if a user brushes their teeth at an average of 1-5 Hz (or potentially less in the case of a motorized toothbrush), a band pass filter of 1-5 Hz may be implemented. Thus when the system 100 detects that amplitude of the frequency band in the 1-5 Hz range reaches a threshold indicating use, the controller 13 may begin to record data from the sensors in the memory 14 for the duration of time the motion data indicates the toothbrush 1 is being used. Additionally, periodic accelerations in certain axes or angular acceleration (for circular brushing) that reaches certain threshold amplitudes may also be used to indicate brushing has initiated. The analysis of the data may also be affected by whether the toothbrush 1 includes an electronic motor to vibrate the head to assist in brushing. In those embodiments, the data may be filtered to eliminate the high frequency acceleration and other noise created by the electronic motor.

In some embodiments, the quality of brushing based of the type of movements the user performs using the toothbrush 1 may be determined. Dentists of indicated that certain movements are more beneficial for brushing, including circular movements, in both clockwise and counterclockwise motions, tip to root motions, and left to right motions. The system 100 may determine if these motions are being performed the relative amount of these motions by filtering the data from motion sensors 11 in certain axes that is indicative of each motion. For example, the data from motions sensors 11 may be filtered in an axis horizontal to gravity, and the controller 13 or other system 100 processors may process the data to determine whether the acceleration, frequency, or other motion data reached a significant enough amplitude in a certain direction to indicate that particular motion is performed. For instance, acceleration alone may be utilized to determine whether back and forth motions are being used, or circular motions. In other embodiments, the acceleration data from motion sensors 11 may be integrated to determine the actual movement of the toothbrush 1 to evaluate the type of brush strokes utilized. The analysis of the data may also be affected by whether the toothbrush 1 includes an electronic motor to vibrate the head to assist in brushing. In those embodiments, the data may be filtered to eliminate the high frequency acceleration and other noise created by the electronic motor.

In some embodiments, an electronic motor to vibrate the head 42 may be included in the toothbrush 1. In those embodiments, the motion data recorded by the sensors relating to brushing movements would have a smaller amplitude than for a manual brush 1. This is because users of manual toothbrushes, without the assistance from the electronic motor and moving head 42, will brush their teeth with more vigorous motions. Accordingly, the algorithms utilized to analyze the motion data to detect, use, motion, and location of toothbrush will be modified to account for the lower amplitudes and/or different motions, and include filtering of the high frequency noise from the motor. Accordingly, in some embodiments, the thresholds set for the amplitude required to detect or indicate a brush stroke would be less, as a user using an electronic toothbrush generally moves the brush at a slower pace, and makes more straight line movements.

Furthermore, pressure sensor 10 may also be utilized to determine whether brushing is actually being performed, or in combination with the motion data from above. For instance, the user may be moving the toothbrush 1 around but not pressing on the teeth. Therefore, accordingly, requiring both motion of a certain frequency, amplitude, or features, and a certain pressure will eliminate many false positives from incidental movement or pressure of the brush that is not happening during brushing. Accordingly, the pressure sensor 10 may output a signal that is analyzed 78 by controller 28 to determine a pressure being applied to the teeth. If the pressure is above a certain threshold, the system 100 may indicate or determine it is likely that a user is brushing. This analysis may be performed by statistical analysis, threshold analysis or other suitable calculation methods for determining a likelihood of brushing based on the amount and/or sustained nature of the pressure recorded by pressure sensor 10.

Usage Monitor for Replaceable Heads

Additionally, the total number of uses for a replaceable toothbrush 1 head 42 may be detected and stored in the memory 13 of the toothbrush 1 or associated with the server 4, to monitor the useful life of a single toothbrush 1 head 42. Thus, the system 100 could provide a notification to the user, for example on their mobile device 30 or through the webpage interface to the sever 4, once a particular toothbrush 1 head 42 has been used a certain number or duration of time. Once a head 42 has been exhausted, the user will disconnect and reconnect a new head 42, which could be interpreted or recorded by the system 100 as attaching a new toothbrush 1. Additionally, each head 42 may incorporate a unique identity module 62 that stores an identifier for that specific head 42, so when a the same head 42 is reattached, for example, for cleaning or other purposes, the system 100 will not assume a new head 42 has been attached.

Brushing Time and Position

Next, the brushing data recorded above may be analyzed 78 to provide feedback on the positional and time quality of brushing 80. This may be presented after brushing has completed or in real time to provide instantaneous feedback to the user. For example, the motion sensors 11 may detect positional information of the toothbrush 1. Using the accelerometer and gyroscope data or other motion sensors 11, the position, orientation, and movement of the toothbrush 1 may be determined and extrapolated to calculate the relative positional movement of the head 42. For instance, if the distance, orientation, and direction of the motion sensors 11 to the bristle portion of the head 42 are known, the system 11 will be able to determine the position of the head 42, and its relative motion, orientation, and coverage area based on the relative motion of the motion sensors 11. This may be calculated by initially calculating a reference coordinate one the toothbrush 1 detects motion, and recording the relative movement with respect to the initial coordinate(s) to determine a signature of the brushing. This may be performed by calculating the movement of the head 42 by calculating the changes in orientation of the brush and the movement due to acceleration recorded by the gyroscope or accelerometer. These calculations may be performed by the controller 13, or other processors that are utilized in the system 100, including a mobile phone processor executing an application on the mobile phone, or a processor(s) on a server running software for analyzing the data.

In some embodiments, a magnetometer sensor 11 may provide additional positional information by detecting the polarity, a directional vector and strength of the earth's magnetic field and/or the magnetic field generated by a magnetic field transmitter 110. In some embodiments, this may be a magnetic field transmitter 110 located in the base station 2, as the base station 2 is stationary, and the magnetic field transmitter 110 would have a known polarity and direction (e.g., horizontal or vertical and in a certain direction). This may be detected by a magnetometer 11 located in a toothbrush 1. Accordingly, the strength of the magnetic field detected by the magnetometer sensor 11 will give an estimate of the distance the toothbrush 1 is from the base station 2 along a sphere or oval curve or egg shaped curve representing the magnetic field lines surrounding the base station 2. Additionally, the magnetometer will be able to sense the vector direction of the magnetic field along the magnetic field lines. In other embodiments, the distance of the toothbrush 1 from the base station 2 may be calculated using: the magnetic field orientation detected by the magnetometer sensor 11 emitted from the magnetic field transmitter 110 together with the attitude information of the accelerometer and gyroscope. This is possible utilizing the knowledge of the shape of the magnetic field and its vectors at particular distances from the transmitter and its polarity. For example, the inclination of the magnetic field with respect to gravity will change predictably at various distances from the magnetic field transmitter for example. Additionally, by comparing the gravity vector with the vector of the magnetic field, the angle may be utilized to calculate the height along the shell or magnetic field lines. This is because the angle of the field with respect to gravity will be different at each height because the egg shell will be directed at a different angle with respect to gravity at each height. This will be especially true when the north and south poles are oriented in a vertical direction, so that the magnetic field lines have components that change from horizontal near the bottom and top of the egg shells to vertical at about the height of the transmitter.

Figure 5:
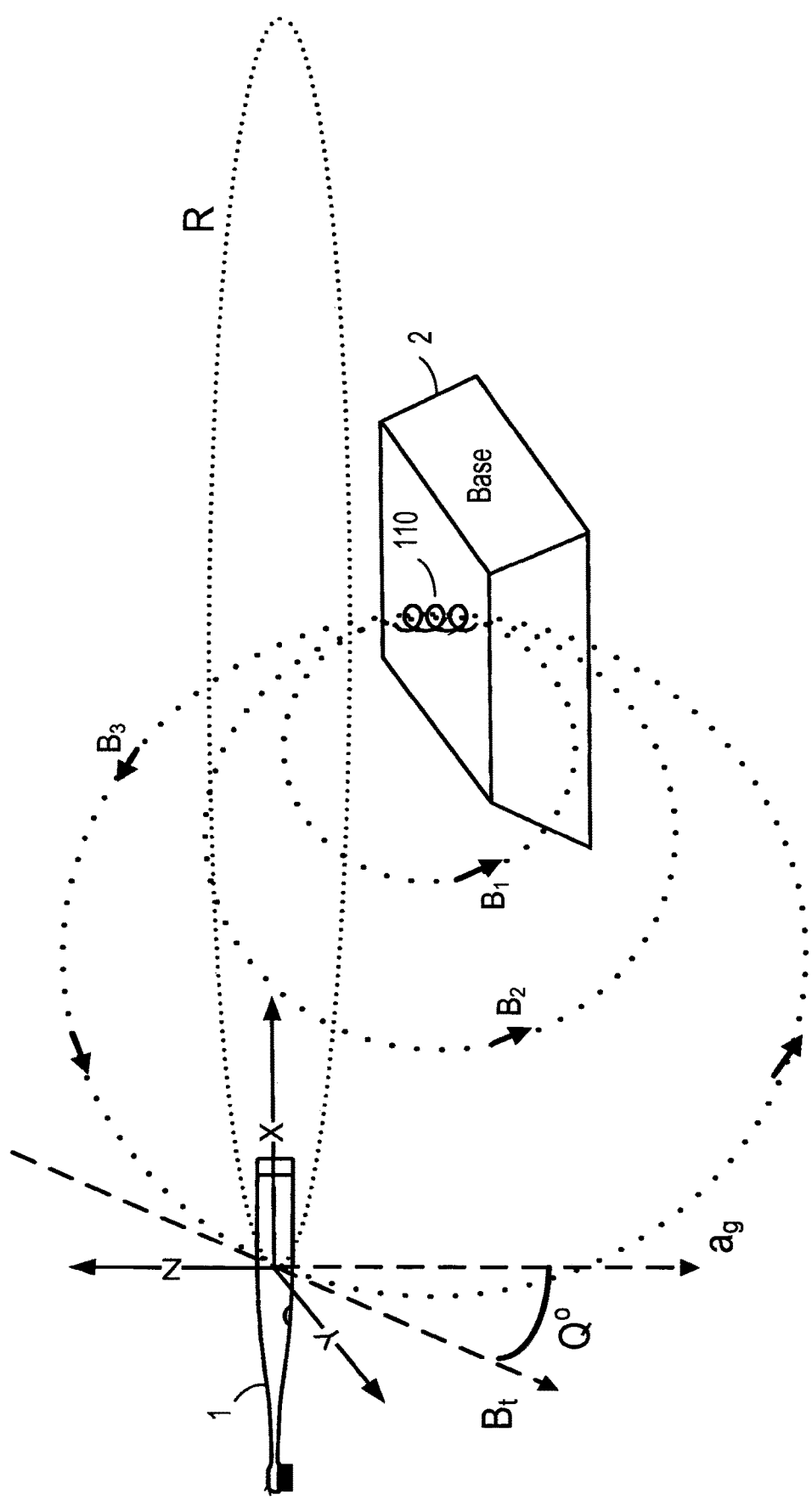
FIG. 5 is a diagram at of the magnetic fields generated and detected by the system.

Accordingly, the magnetometer data combined with the accelerometer data may be utilized to determine position of a toothbrush 1 within a ring that is situated in a horizontal plane that is of equal magnetic field strength around the transmitter 110. For example FIG. 5 illustrates an embodiment of a base 2, with a single coil magnetic field transmitter 110, that generates shells that have slices with B (magnetic) field vectors that change direction in a vertical plane. Sensors 11 on the toothbrush 1 may include a magnetic field sensor 11 to detect the magnetic field generated by the magnetic field transmitters 110 and an accelerometer 11 to detect, among other accelerations, the acceleration of gravity $a_g$. Accordingly, the magnetometer 11 on the toothbrush 1 may be positioned with the B field generated by the transmitter 110. Accordingly, a magnetic field strength and direction ($B_t$) may be determined by the magnetometer 11. Simultaneously, an accelerometer 11 may detect the acceleration from gravity as vector $a_g$. The system 100 may the analyze that data, and determine an Q° between the gravity vector $a_g$ and magnetic field vector $B_t$.

The angle Q° may then be able to be used to determine a ring R wherein the toothbrush 1 position is known to be at some point along ring R. For instance, first, the strength of the magnetic field B detected by the magnetometer 11 can be utilized to determine which magnetic field egg or donut shaped shell the toothbrush is on (e.g., $B_1$, $B_2$, or $B_3$). This would narrow the position of the toothbrush 1 down to a hollow shell or donut surround the transmitter 110. Next, Q° can be unitized to calculate a vertical position on the shell or donut and therefore narrow the position down a ring R surrounding the transmitter 110. Accordingly, if the system 100 detects movement to a new ring R, the system will have information about the possible direction and distances traveled. This information will be enhanced by the accelerometer data, which will provide further information about the direction traveled. This, for example, may provide certain upper or lower bounds of direction and/or distance traveled by the toothbrush 1. Thus, this system 100 and data processing technique may be utilized to provide relative position and movement information of the toothbrush 1 and applied to determine tooth brushing position in the mouth as described herein.

In some embodiments, a magnetometer sensor 11 may sense a magnetic field transmitted by a magnetic field transmitter 110. In order to do this, this magnetic field data must be filtered out from extraneous noise and especially from the earth's magnetic field. The earth's magnetic field will be of relatively constant strength and direction at a given location on the scale of movement of a toothbrush. Additionally, the earth's magnetic field is quite large and most magnetometers are calibrated to the scale of the earth's magnetic field. Accordingly, to use a magnetometer calibrated for the earth's magnetic field, for instance, in embodiments that detect both the earth's and the transmitters 110 magnetic field to calculate orientation and position changes, certain filtering algorithms must be used to distinguish the two. In some embodiments, the critical data that may be utilized to filter the two is that the strength of the earth's magnetic field remains relatively constant on the scale of toothbrush movement, compared to the change in magnetic field detected that is transmitted by the magnetic field transmitter 110. Therefore, temporal filters may applied to distinguish the two magnetic fields. In some embodiments, the magnetic field transmitted by transmitter 110 may be pulsed at a certain frequency or amplitude in order to be easily filtered out using signal processing and data analysis.

In some embodiments, the magnetic field directional component of the vector data output from the magnetometer 11 may also be utilized to calculate a relative position change and/or orientation. For example, in some embodiments, the transmitter 110 may transmit a magnetic field with a vector orientation illustrated in FIG. 5. Directional or vector information detected by a magnetometer from a magnetic field B created by transmitter 110 may be useful to provide orientation and or relative positional information. This data may then be combined with data from the directional vector information detected from the earth's magnetic field which would likely have an orientation that differs from the orientation of the earth's magnetic field. Accordingly, the magnetometer 11 may detect vectors indicating the direction of the earth's magnetic field and the vectors of the magnetic field of the transmitter 110 to provide a reference for orientation in space and for changes in position.

In one example, the magnetometer sensing the earth's magnetic field could sense an orientation of the toothbrush 1 in a horizontal plane as would a compass or about the Z axis illustrated in FIG. 5. In some embodiments, this may include a vector not only in the horizontal direction but in the vertical direction that will be constant and based on the inclination of the earth's magnetic field at a particular geographic location. In other embodiments the transmitter 110 may be placed in a diagonal, horizontal, vertical or other known orientation which is used as a reference point to calculate orientation of the magnetometer 11 and positional changes of the magnetometer 11 and toothbrush 1.

Furthermore, calibration may be necessary based on the relative orientation of the toothbrush 1 when being used by a user and the base station's magnetic field transmitter 110. As the shape and orientation of magnetic field lines change based on the position with respect to the magnetic field generator, different formulas, calibrations, or adjustments may need to be performed. For example, near the side of a magnetic field generator, the flux lines may be oriented in a first direction; however, near either polar end of the transmitter 110 (e.g., above or below, or the right or left side) the flux lines may be oriented perpendicular to the first direction near the side or middle of the transmitter 110. Additionally, the user may be required to brush her teeth a certain distance from the transmitter 110 to ensure a proper magnetic field for measuring is generated in that position. The beneficial aspect of the coils being physically oriented in the vertical direction is that the magnetic field generated is relatively the same on all sides of the transmitter 110 (and by proxy, the base station 2) assuming relatively the same height, and therefore calibration may require simpler algorithms and/or processes. However, if the coils lie in a horizontal plane, depending on the orientation of the base station 2, the magnetic flux lines may be traveling in different directions. In that embodiment, the user may be instructed to swivel the base station 2 to point it in a certain direction with respect to the user where the user typically brushes their teeth. In other embodiments, the calibration may be able to utilize or accommodate for changes in the vector direction of the magnetic field transmitted by the transmitter 110.

The data from a magnetometer 11 may be combined with the data output from an accelerometer 11 or data from the gyroscope 11 and accelerometer 11 to determine orientation and/or position. For example, the accelerometer 11 data may first be utilized to determine the orientation of the toothbrush 1 with respect to gravity during periods of relatively little acceleration, so the acceleration of gravity would be detected by a three axis accelerometer so it could be determined whether the toothbrush 1 is tilted about a lateral axis that is in a horizontal plane, or how it is rotated about a its longitudinal axis (a longitudinal axis running lengthwise through the toothbrush) with respect to a gravity pointing down towards the earth. If the accelerometer data indicates the toothbrush 1 is experiencing relatively small amounts of acceleration relative to normal tooth brushing movements, the controller may determine that the toothbrush 1 is relatively still and the accelerometer data can be utilized to determine a vector oriented in the direction of gravity. If the accelerometer data is combined with the gyroscope data, deviations of the attitude of the tooth brush with respect to gravity can be determined to calculate the attitude of the toothbrush. For example, the initial recording of the gravity vector may then be used as a reference vector to determine attitude. Then deviations from this initial position or attitude determined by the accelerometer and gyroscope may be determined by calculating orientation changes from the initial reference vector based on gyroscope data. Accordingly, the accelerometer or accelerometer and gyroscope data may be utilized to determine which way the bristles are facing. For example, in some embodiments, the accelerometer and gyroscope data may be analyzed to determine whether the bristles are facing upward forwards or downwards, front, left and right side, potentially narrowing down to a specific quadrant or other division of the mouth. For example, when the toothbrush 1 bristles are facing down they could only be brushing the tops of the bottom teeth. If the toothbrush 1 bristles are facing up, it could only be brushing the crowns or tips of the upper teeth. As a further example, when the toothbrush 1 is facing right, it could only be brushing the left sides of the molars, etc. Additionally, in some embodiments, the orientations with respect to gravity will be deterministic as a vector representing gravity always points in the direction towards the floor or earth, and brushing will very likely take place standing up straight. Therefore, it is possible to determine the orientation of the bristles with respect to the teeth in some aspects or planes of orientation. In certain embodiments, these calculations may be made deterministically, or estimated using statistics and/or a retrofitted model of the mouth. For example, if the accelerometer senses the toothbrush's bristles are facing down within a certain margin of error or within a statistically significant margin, then the system can determine that the surfaces being brushed are likely the tops of the lower teeth (or the tongue for example). In other embodiments, as disclosed herein, the brushing orientations may be calculated relative to each other, so a model of the mouth may be fit each time the user brushes their teeth.

To determine the orientation in a horizontal plane perpendicular to gravity, the earth's magnetic field or the magnetic field generated by the base station 2 transmitter 110 for example, may be utilized. In some embodiments, the magnetic field transmitter 110 will generate a magnetic field with a with directional vectors that change direction in a horizontal plane that is perpendicular to gravity. Accordingly, even if the absolute direction is not known, a relative orientation of the toothbrush 1 with respect to the magnetic field detected by the magnetometer 11 and emitted by the transmitter 110 may be determined in a horizontal plane. Accordingly, relative changes of this orientation in a horizontal plane could be determined and a path of movement along a reference coordinate system may be determined. In some embodiments, the reference coordinate system may be based on one of the initial or any other data points recorded during a tooth brushing session. As disclosed herein, these relative changes may be utilized to calculate the positions or reconstruct the shape by using relative positions after a user is finished brushing.

In some embodiments, data from both the gyroscope, magnetometer, and accelerometer may be utilized to determine an orientation with respect to gravity and either or both of the earth's and the transmitters 110 magnetic field. In some embodiments, orientation may be determined and confirmed or validated by the different sensors 11. For example, the angular velocity from a gyroscope may be integrated to determine orientation changes in certain directions, but errors from integration may be corrected using the magnetometer readings. In other embodiments, either or both the magnetometer, gyroscope and magnetometers may be utilized in various combinations to determine orientations.

In some embodiments, orientation alone may be utilized to determine the position of the toothbrush 1 using statistical analysis as disclosed herein. In other embodiments, the gyroscope and/or accelerometer detected inertial changes may be used in conjunction with or separate from magnetometer 11 readings to be provide further indications of movement or distance to calculate an estimated position of the toothbrush 1 bristles. In some embodiments, the orientation information may be combined with data output from sensors 11 that indicate translational inertia, or positional changes. Depending on the location of the inertial sensor, the orientation information may be combined with the inertial movement data to indicate the position of the bristles. For instance, if a motion sensor 11 is located inside the toothbrush 1, but in the middle of the toothbrush's longitudinal axis where the user would hold the toothbrush 1, changes in orientation would move the head without moving the position (although it may rotate in place) of the motion sensor 11. Accordingly, the orientation information can also be used to calculate a position in space of the bristles relative to the sensor's 11 position.

Movement or positional changes may also be calculated from data output by the magnetometer 11. In some embodiments, the magnetometer 11 may detect a magnetic field generated by a magnetic field transmitter 110 in the base station 2 or another stationary component that is separate from the toothbrush 1. In this embodiment, the strength and orientation of the magnetic field sensed by a single, two, or three axis magnetometer 11 can provide additional data on the positional movement of the toothbrush 1 with respect to the magnetic field transmitter 110 in the base station 2, which is fixed and stationary. Accordingly, the increase or decrease in magnetic field will indicate that the toothbrush 1 is moving towards or away from the base station 2. Additionally, changes in the orientation or inclination of the magnetic field and its polarity output by the magnetometer 11 can be utilized to determine translational and position. This information may be utilized to determine, based on calibration or experimental data, how much a per unit change in magnetic field strength is equivalent to in distance based on the direction of movement (as different directions through a magnetic field will have higher or lower rates of change). In other embodiments, the per unit change in inclination or shape of the magnetic field may also be correlated to changes in position. The respective orientation of a horizontal magnetic field may be different each time a toothbrush system as disclosed herein is set up, including such a system that incorporates a magnetometer in the base station 2. This is because how each user stands as they are brushing their teeth, and/or how the base station 2 is oriented on the top of the counter may change for each user and even change somewhat each time and after cleaning the countertop, etc. Accordingly, adaptive statistical analysis may be utilized to determine relative positions of the bristles of the toothbrush 1.

Positional data calculated from magnetic field data output from a magnetometer 11 may be combined with inertial data to calculate positional changes in the toothbrush 1. In some embodiments, the inertial data may be utilized to calculate distance traveled and the magnetometer data may also be utilized to eliminate errors, and/or provide bounds to the calculations for positional changes based on the inertia data. For example, the changes in magnetic field strength may have a certain minimum lower bound limit assuming travel directly perpendicular to the magnetic field lines where they are most compressed. Given a certain change in magnetic field strength, it could be determined that the magnetometer had at least traveled a certain Euclidean distance in space (or changed a certain angular orientation). These changes in inclination and field strength may be utilized to determine distance changes within certain margins of error that may be supplemented or fine-tuned according to accelerometer or gyroscope data. This data could be combined with orientation and inertial data to determine a more precise distance traveled and relative directional travel of the toothbrush 1.

In order to utilize the data from the sensors to estimate the amount of time spent in each section, quadrant or other logical division of the mouth, the user may need to calibrate the toothbrush 1. In some embodiments, calibration may take place at the factory, by the user or both. Accordingly, calibration could be utilized to calibrate a specifically manufactured unit, and to adapt to a particular user's geography, anatomy (i.e. height) and/or bathroom environment, which for example, may include unique magnetic interferences unique heights and orientations (tabletops may not be level, etc.). For example, in some embodiments, the user may apply a colored gel to their teeth. The user can then turn the toothbrush 1 in calibration mode once the toothbrush 1 is in position in by the teeth and brush away all of the colored gel, while the motion sensors 11 and other sensors are recording data. At this point, the user may switch off calibration to stop the acquisition of calibration data. In other embodiments, once the user turns on the calibration function, the toothbrush 1 would detect the points in time when the user has started and stopped brushing, including any pauses in the brushing. This calibration procedure provides reference positional, orientation, and motion calibration data that can then be compared to subsequent brushes using statistical analysis 78, or other analysis methods to determine whether subsequent brushes have brushed all regions of the mouth for sufficient time.

Once the device is calibrated, or using reference data from previous brushing or and other model users brushing, brushing data from each usage may be compared to reference data to evaluate its quality 78 and determine the position of the toothbrush 1 in the newly acquired data. For instance the calibration data may be utilized to prepare a statistical model of the shape and dimensions of a specific user's mouth and be used to create certain statistical boundaries for determining when the toothbrush 1 is brushing any certain section of the user's mouth. Then, once a user initiates brushing a second time, the newly recorded data could then be overlaid or correlated with the calibration brushing data associated with that user profile 60, to determine whether and where there were any deficiencies in the brushing. For instance, the system 100 may determine how much time is spent brushing each quadrant, how many strokes, or perform other evaluations of the brushing. Additionally, the analysis may indicate that a user brushed too much in certain areas or did not use the correct stroke patterns generally or in specific sections of the user's mouth.

The correlation may be performed by statistical analysis, for example, a quantitative comparison of such differences can be made simply by measuring the Euclidean distance in the 3xz space. Such vectors may then be treated by using a statistical analyses, including principal component analysis (PCA), hierarchical cluster analysis (HCA), regression analysis, and linear discriminant analysis. Statistical methods suitable for high dimensionality data may be utilized. As an example, HCA systematically examines the distance between the data that represent each type of motion or positional data. A dendrogram can then be generated that shows the clustering of the data from the Euclidean distances between and among the data vectors, much like an ancestral tree.

Each statistical data cluster may be representative of sensor data for each section, quadrant or other logical division of the user's mouth. For example, the mouth may be divided into, top and bottom, with top and bottom each having a right front and left portion, and each of the right, front and left portions, having an inside, top, and outside face. Accordingly, the mouth may have 36 different sections, 10 sections, 8 sections, 12 sections, or 4 sections (quadrants), top and bottom only, outer and inner only, and other logical divisions. Accordingly, using reference data, the controller 13, or other processors in the system 100 (e.g., processors in the mobile phone or servers), may calculate the confidence interval or other value indicating the likelihood the toothbrush is brushing a specific section of the user's mouth, but determine the likelihood the strokes correlate or relate to the calibration data in those sections. In order to acquire a reference position, the user may be instructed to initiate brushing at an identical position of the mouth. That way, the data starts at a known position and can use that as a reference point to relate the rest of the data using statistical analysis. For instance, the angle, orientation, calculated distance and other features from the reference position of the toothbrush 1 detected by the motion sensor 11 may indicate the likelihood each new position is correlated to a certain position of the mouth based on calibration data.

In other embodiments, the controller 13 or other system processors (e.g. processors in the smartphone, servers, or other components) may process the statistical data and determine that the brush is brushing a certain section of the mouth if the statistical analysis shows with great than 95%, 85%, 80% or other suitable certainty that the brush is within the section of the mouth. In some embodiments, the specificity or sensitivity of the brushing statically analysis may be modified to match a specific user's variance.

This analysis may include an output 80 that allows the controller 13 or other processors to determine which brush strokes were in each section of the mouth or tooth set, and therefore how much time a user spend brushing each quadrant, half or tooth, or other logical division of the mouth and how those times compare to recommended regimes. In other embodiments, the time at the beginning and end of entering a certain area may be recorded, or other suitable methods to determine how much time is spent brushing each section of the mouth.

In some embodiments, rather than detect the position of the toothbrush, the system 100 may direct the user to brush certain sections of the mouth one at a time, and only determine whether or not the user is actually brushing, and count or record brushing time only while motion indicative of brushing is detected. Then, once brushing has been recorded in the directed section for the prescribed time, the system 100 would indicate to the user that it is time to move to the next section of the mouth, and elapse time when the user is actually brushing. This prevents the user from taking breaks and thereby brushing for less than the optimal amount of time in each section. Accordingly, the controller 13 or other processors may analyze the data from the sensors 11 (or pressure sensor 10) to record the amount of time the user was brushing in each section while the system 100 indicated the user should be brushing in that particular section.

In other embodiments, pressure exerted on the head 42 from brushing may also be detected by a pressure sensor 10 incorporated into toothbrush 1. For example, the pressure sensor 10 may incorporated into the 42, and detect a pressure associated with usage. Additionally, the pressure may be mapped to the various positional data and therefore the controllers 13 or other processors of the system 100 may calculate the amount of pressure utilized for brushing each area of the mouth.

Presentation of Feedback

Once the system's 100 controller(s) 13, or other processors contained in the smartphone, servers, or other components of the system 100 have analyzed the usage data 78, feedback may be presented to the user 80 through the speaker 50, the visual indicators 52 on the toothbrush 1, or through an associated mobile device 30 or other computing device in data communication with the system 100. This feedback may be presented instantaneously or available for access to check progress.

For instance, instantaneous feedback may be provided to the user 80 during brushing, that includes indications by audio or visual means that indicate how much time is left, whether to brush harder or softer, whether certain quadrants have been sufficiently brushed, and when brushing is completed. For example, a red light or stop sound may be produced through the speaker 50 to indicate the brushing is completed.

Additionally, historic and average brushing times and positional data may be presented to the user 80 on the mobile device or other computing device using graphs, charts, percentages and other metrics. For instance, the user could be presented with the average time spent per day, per quadrant, and the average days the user brushes once, twice or other times. Additionally, the average time spent brushing per tooth may be calculated and presented to the user on the mobile device 30 or other computing device. A program 15 running on the mobile device may control the presentation of the data, using the mobile device 30 controller 13.

API for Dentist Integration

An API may also be developed for transferring the brushing and usage data to a dentist for professional evaluation and feedback on brushing habits and techniques. Furthermore this data may be evaluated to determine brushing techniques that result in more dental issues, including cavities and gum disease. For instance, the width or height of the strokes may be correlated to how high along the gum-line the brush reaches, indicating whether the gums are properly brushed. This could be analyzed to determine whether short strokes in height lead to more frequent instances of gum disease.

Gamification

The usage data may also be used to create games for children or family members to play alone or against each other, to hit certain thresholds of usage. This can provide a unique motivational tool for users to brush their teeth on a regular basis. Accordingly, as delayed feedback, for example, in the case of gum disease or cavities generally is discounted psychologically, the more immediate and continual concrete, and quantitative feedback of the present disclosure will provide a much better incentive to conform to recommend brushing regimens.

The invention claimed is:

1. An electronic toothbrush system for monitoring brushing and compliance with a tooth brush regime, the system comprising:
   a toothbrush including a handle and a head;
   a base station including a magnetic transmitter configured to transmit a magnetic field;
   an accelerometer incorporated in the toothbrush and configured to output data representing a direction of acceleration due to gravity;
   a magnetometer incorporated in the toothbrush configured to output data relating to the strength and direction of the magnetic field;
   a memory for storing the data output by the accelerometer and the magnetometer; and
   a controller in data communication with the memory, the controller being configured to determine an orientation of the toothbrush in space based on at least the data output by the magnetometer and the accelerometer, wherein the orientation of the toothbrush in space is determined with respect to gravity and the magnetic field.

2. The system of claim 1, wherein the toothbrush further includes a gyroscope configured to output data relating to orientation changes of the toothbrush and wherein the controller is further configured to determine the orientation of the toothbrush in space additionally based on the data output from the gyroscope.

3. The system of claim 1, wherein the controller is further configured to determine relative positional changes of the toothbrush using data output from the accelerometer and the magnetometer.

4. The system of claim 1 wherein the controller utilizes the data output from the magnetometer to determine an estimated distance window within which the toothbrush has changed position.

5. The system of claim 1, wherein the controller utilizes a statistical analysis to determine positional changes.

6. The system of claim 5, wherein the statistical analysis is performed using relative positional changes based on a reference coordinated system determined during each session of brushing.

7. The system of claim 6, wherein the statistical analysis is performed by fitting the data from the magnetometer and the accelerometer to calibration data after the controller determines a completed brushing session.

8. The system of claim 1, wherein the controller is further configured to determine the orientation of the toothbrush by analyzing data from the magnetometer representing the strength and direction of the earth's magnetic field.

9. An electronic toothbrush system for monitoring brushing and compliance with a tooth brush regime, the system comprising:
   a toothbrush including a handle and a head;
   a base station including a magnetic transmitter configured to transmit a magnetic field;
   an accelerometer incorporated in the toothbrush and configured to output data relating to acceleration of the toothbrush;
   a magnetometer incorporated in the toothbrush configured to output data relating to a strength of the magnetic field;

a memory for storing the data output by the motion accelerometer and magnetometer sensor; and a controller in data communication with the memory, the controller being configured to determine a relative distance and direction of positional movement of the toothbrush based on at least the data output by the magnetometer and the accelerometer, wherein the direction of positional movement of the toothbrush is determined with respect to gravity and the magnetic field.

10. The system of claim 9, wherein the controller utilizes the data output from the magnetometer to determine an estimated distance window within which the toothbrush has changed position.

11. The system of claim 9, wherein the toothbrush further includes a gyroscope that outputs data relating to orientation changes of the toothbrush and wherein the controller calculates an orientation of a toothbrush in space additionally based on the data output from the gyroscope.

12. The system of claim 9, wherein the magnetic field transmitter is oriented in the base station such that a polar axis of the magnetic field lies in an approximately horizontal plane.

13. The system of claim 9, wherein the magnetic field transmitter is oriented in the base station such that a polar axis of the magnetic field lies in an approximately vertical plane.

14. A method for determining the orientation of a toothbrush with respect to gravity and a magnetic field, the method comprising:

generating a magnetic field with a magnetic field transmitter in a toothbrush base station;

recording, during a calibration session, calibration data from both (i) an acceleration sensor incorporated in a toothbrush representing an acceleration of the toothbrush and (ii) a magnetometer incorporated in the toothbrush representing a strength of the magnetic field detected by the magnetometer;

storing the calibration data in a memory;

recording, during a tooth brushing session, usage data from the acceleration sensor and the magnetometer; and performing a statistical analysis on the usage data and the calibration data to determine at least one orientation of the toothbrush with respect to gravity and the magnetic field.

15. The method of claim 14, wherein the statistical analysis is performed using a regression analysis.

16. The method of claim 14, wherein the statistical analysis is performed using a reference starting position in a mouth of a user of the toothbrush recorded during the tooth brushing session.

17. The method of claim 14, wherein the performing the statistical analysis on the usage data and the calibration data also includes determining a relative positional movement of the toothbrush.

* * * * *